(12) United States Patent
Moribe

(10) Patent No.: US 9,894,250 B2
(45) Date of Patent: Feb. 13, 2018

(54) IMAGE PROCESSING APPARATUS, IMAGE FORMING APPARATUS, IMAGE PROCESSING METHOD, AND NON-TRANSITORY COMPUTER READABLE STORAGE MEDIUM CONFIGURED TO GENERATE, BASED ON CORRECTION DATA, DATA INDICATING ON DOT POSITIONS DURING PRINTING AND SCANNING

(71) Applicant: CANON KABUSHIKI KAISHA, Tokyo (JP)

(72) Inventor: Shoei Moribe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/239,252

(22) Filed: Aug. 17, 2016

(65) Prior Publication Data

US 2017/0064150 A1    Mar. 2, 2017

(30) Foreign Application Priority Data

Aug. 27, 2015 (JP) ................................ 2015-168136

(51) Int. Cl.
*H04N 1/60* (2006.01)
*H04N 1/50* (2006.01)
*H04N 1/52* (2006.01)

(52) U.S. Cl.
CPC ........... *H04N 1/6066* (2013.01); *H04N 1/502* (2013.01); *H04N 1/52* (2013.01); *H04N 1/6019* (2013.01); *H04N 2201/0082* (2013.01)

(58) Field of Classification Search
None
See application file for complete search history.

(56) References Cited

U.S. PATENT DOCUMENTS

| 2008/0062482 | A1* | 3/2008 | Sasaki | H04N 1/6027 358/523 |
| 2013/0194593 | A1* | 8/2013 | Yanai | G06K 15/105 358/1.8 |
| 2015/0181083 | A1* | 6/2015 | Kajiwara | H04N 1/6027 358/3.05 |
| 2016/0142587 | A1 | 5/2016 | Moribe | |

FOREIGN PATENT DOCUMENTS

| JP | 2008-213271 A | 9/2008 |
| JP | 2010-120185 A | 6/2010 |
| JP | 2012-035603 A | 2/2012 |

\* cited by examiner

*Primary Examiner* — Marcellus Augustin
(74) *Attorney, Agent, or Firm* — Carter, DeLuca, Farrell & Schmidt, LLP

(57) ABSTRACT

A unit acquires first image data expressing a color of an image and second image data expressing a feature of the image. A unit color-separates the first image data into first and second color material amount data. A unit generates inverted data by inverting the second image data. A unit generates first corrected data from the first color material amount data and the inverted data and generates second corrected data from the second color material amount data and the second image data. A unit generates, based on the first corrected data, first data indicating on dot printing positions during a printing and scanning operation, generates, based on the second corrected data, second data indicating on dot printing positions in the operation, and generates, based on the first and second data, image forming data.

21 Claims, 15 Drawing Sheets

FIG. 3A

| 401 | | 402 | | 403 |
|---|---|---|---|---|
| Low-gloss color material amount data (all 14s, 4×4) | × | Inverted gloss image data (all 11s, 4×4) | ÷15 = | Low-gloss corrected color material amount data (all 10s, 4×4) |

FIG. 3B

| 404 | | 405 | | 406 |
|---|---|---|---|---|
| High-gloss color material amount data (all 16s, 4×4) | × | Gloss image data (all 5s, 4×4) | ÷15 = | High-gloss corrected color material amount data (all 5s, 4×4) |

FIG. 6A LOW-GLOSS CORRECTED COLOR MATERIAL AMOUNT DATA

FIG. 6B DITHER MATRIX (INITIAL VALUE)

FIG. 6C $D_1 = 2$ LOW-GLOSS IMAGE FORMING DATA

FIG. 6G $D_5 = 1$ LOW-GLOSS IMAGE FORMING DATA

Figures 7A, 7B, 7C, 7D, 7E, 7F, 7G, 7H, 7I, 7J:
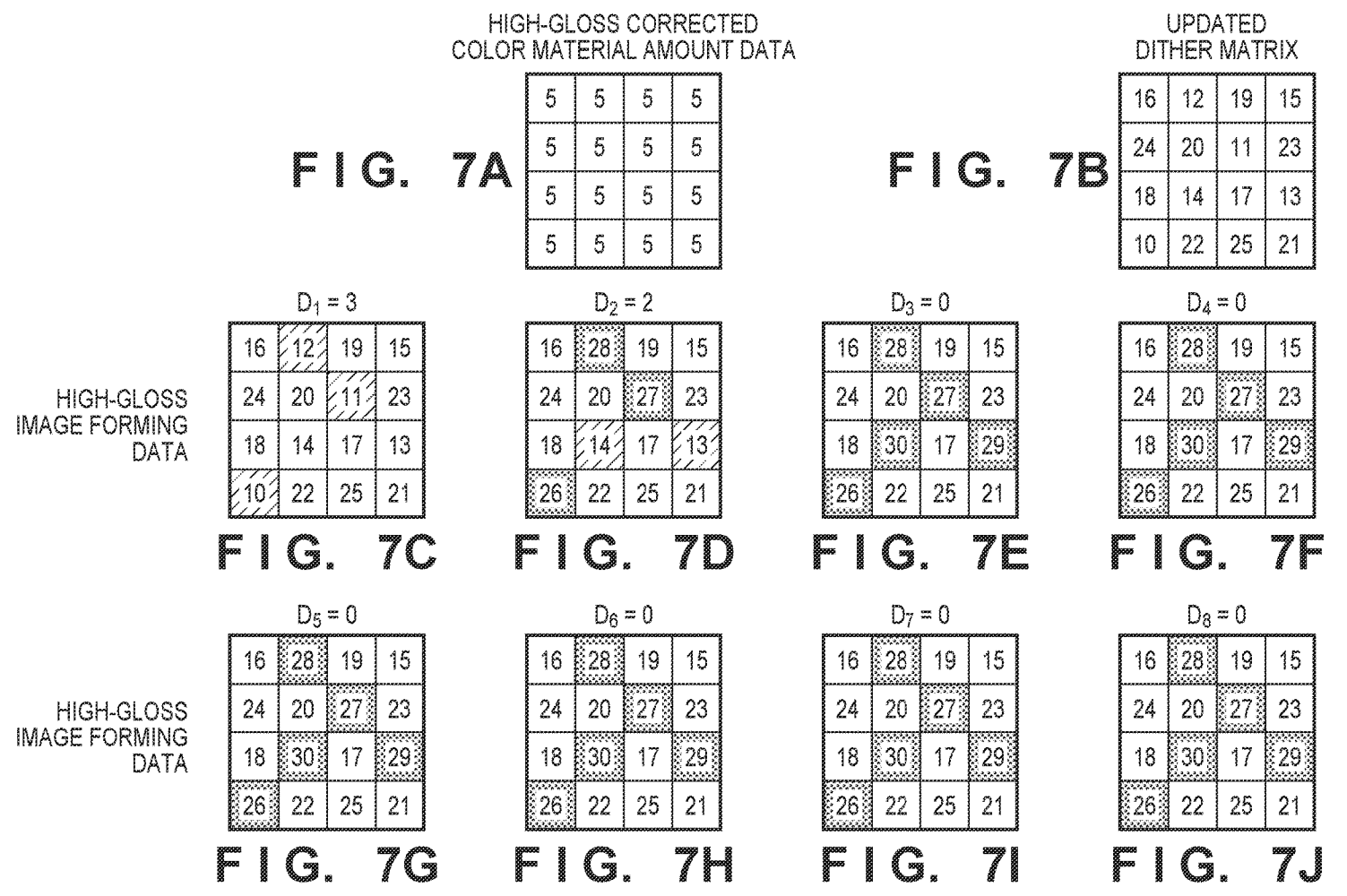

FIG. 7A HIGH-GLOSS CORRECTED COLOR MATERIAL AMOUNT DATA

FIG. 7B UPDATED DITHER MATRIX

FIG. 7C $D_1 = 3$ HIGH-GLOSS IMAGE FORMING DATA

FIG. 7G $D_5 = 0$ HIGH-GLOSS IMAGE FORMING DATA

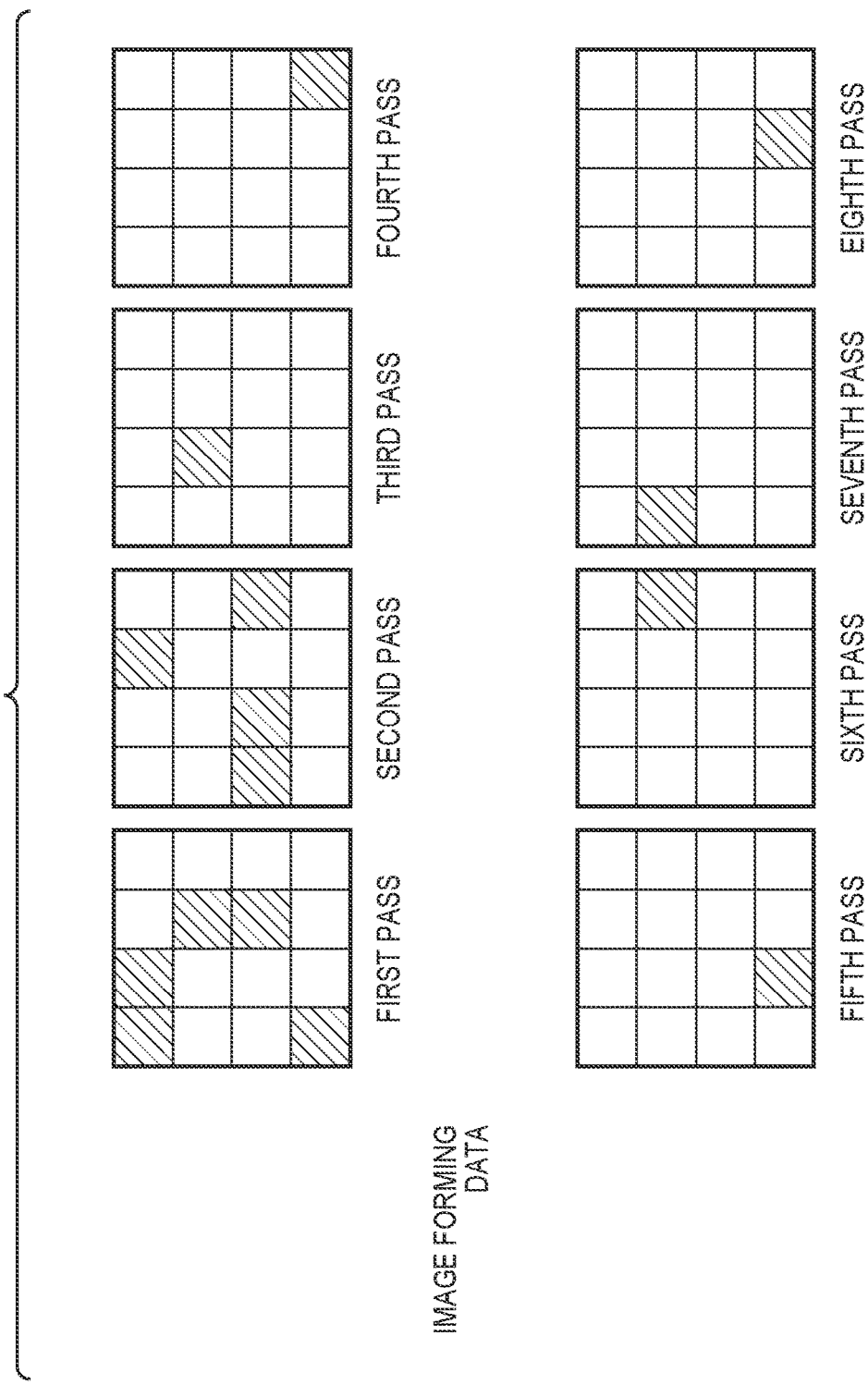

Figures 9A, 9B, 9C, 9D, 9E, 9F, 9G, 9H, 9I, 9J:
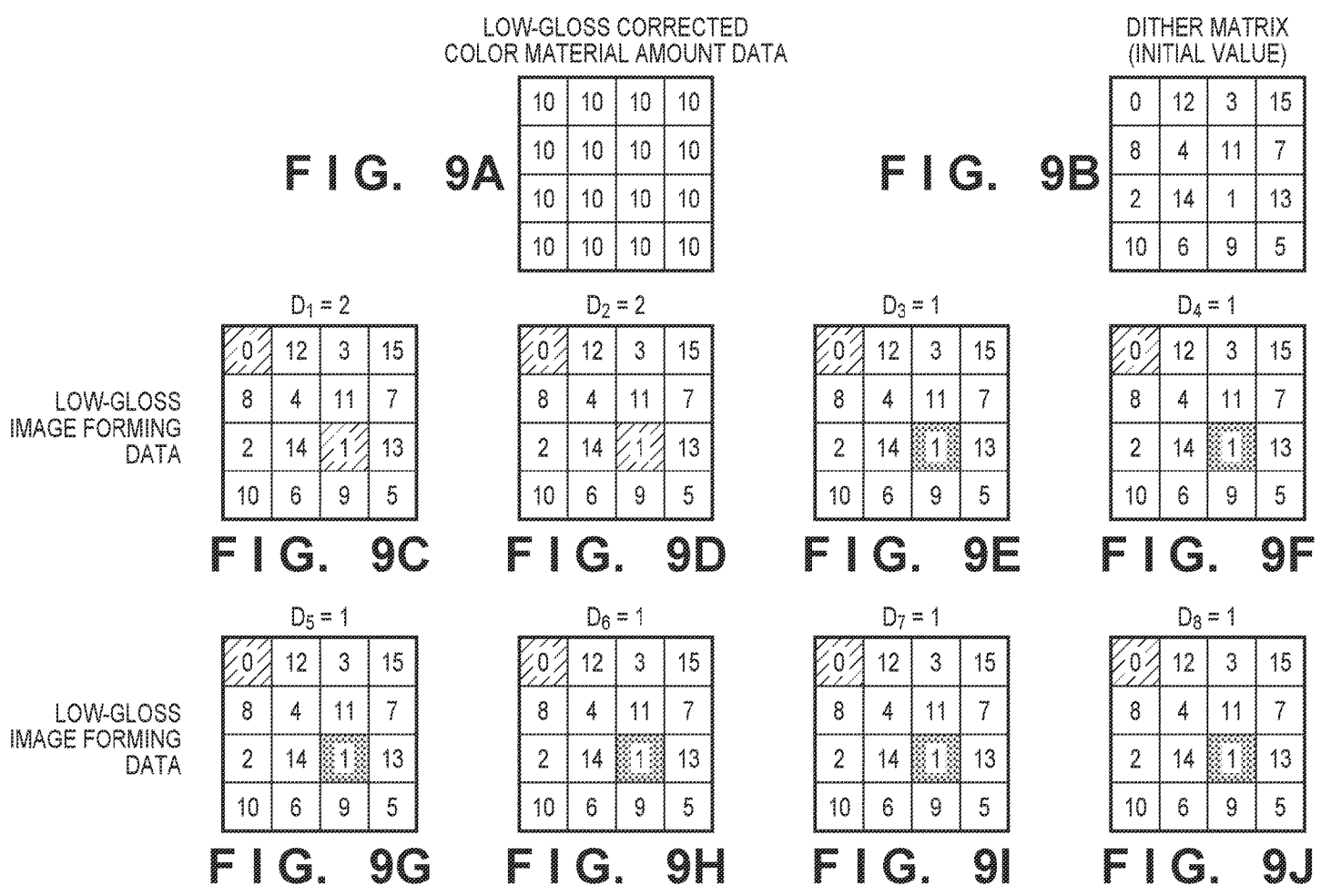

FIG. 9A LOW-GLOSS CORRECTED COLOR MATERIAL AMOUNT DATA

FIG. 9B DITHER MATRIX (INITIAL VALUE)

LOW-GLOSS IMAGE FORMING DATA

FIG. 11

| GLOSS REPRODUCIBLE RANGE TABLE |||||
|---|---|---|---|---|
| R | G | B | LOW-GLOSS VALUE $G_L$ | HIGH-GLOSS VALUE $G_H$ |
| 0 | 0 | 0 | 38 | 65 |
| 0 | 0 | 16 | 40 | 63 |
| 0 | 0 | 32 | 39 | 64 |
| ⋮ | ⋮ | ⋮ | ⋮ | ⋮ |
| 255 | 255 | 255 | 51 | 80 |

| | | | COLOR IMAGE CORRECTION TABLE | | | | | |
|---|---|---|---|---|---|---|---|---|
| R | G | B | LOW GLOSS | | | HIGH GLOSS | | |
| | | | R | G | B | R | G | B |
| 0 | 0 | 0 | 0 | 0 | 2 | 0 | 0 | 0 |
| 0 | 0 | 16 | 0 | 0 | 15 | 0 | 0 | 17 |
| 0 | 0 | 32 | 0 | 0 | 32 | 0 | 0 | 32 |
| ⋮ | ⋮ | ⋮ | ⋮ | ⋮ | ⋮ | ⋮ | ⋮ | ⋮ |
| 255 | 255 | 255 | 255 | 255 | 255 | 255 | 255 | 255 |

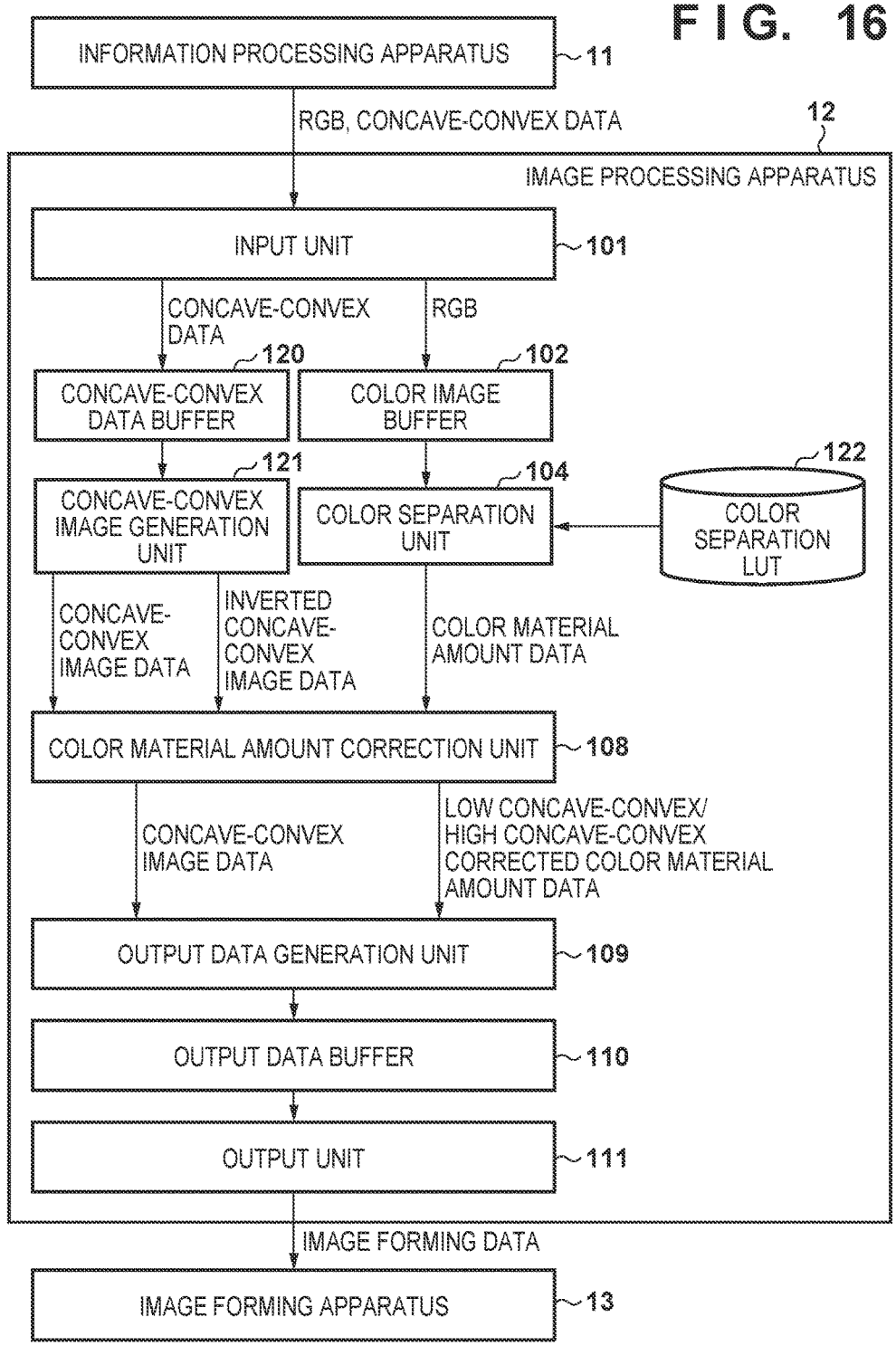

IMAGE PROCESSING APPARATUS, IMAGE FORMING APPARATUS, IMAGE PROCESSING METHOD, AND NON-TRANSITORY COMPUTER READABLE STORAGE MEDIUM CONFIGURED TO GENERATE, BASED ON CORRECTION DATA, DATA INDICATING ON DOT POSITIONS DURING PRINTING AND SCANNING

BACKGROUND OF THE INVENTION

Field of the Invention

The present invention relates to control of a feature such as the glossiness of an image to be formed.

Description of the Related Art

In the field of commercial printing, there is a rising demand to customize and to increase the quality of a printed material. As the methods of implementing this demand, there are techniques to control the glossiness of a printed material. As such techniques, a method of controlling the use amount of a gloss adjustment material (Japanese Patent Laid-Open No. 2008-213271), a method of implementing a uniform glossiness by controlling the concentration degree of a dot arrangement (Japanese Patent Laid-Open No. 2010-120185), and a method of implementing a uniform glossiness by changing the number of printing and scanning operations for each color material (Japanese Patent Laid-Open No. 2012-035603) are known. In each of these techniques, it is necessary to perform gloss control and prevent image quality degradation of a color image.

According to the technique of Japanese Patent Laid-Open No. 2010-120185, although it is possible to control glossiness in a predetermined area of an image, the number of reproducible gloss tones is limited to the number of dot arrangement types. According to the technique of Japanese Patent-Laid Open No. 2012-035603, the number of reproducible gloss tones is limited to the number of scanning count types. Hence, according to these techniques, it is difficult to acquire a smooth gloss change since the number of gloss tones is small.

In contrast, according to the technique of Japanese Patent Laid-Open No. 2008-213271, the number of reproducible gloss tones is determined by the use amount of a gloss adjustment material, and smooth gloss control is possible. However, a gloss range (dynamic range) that is controllable by only the use amount of a gloss adjustment material is not very wide. In this manner, it is difficult to acquire feature reproduction such as smooth gloss reproduction in a wide dynamic range by conventional glossiness control techniques.

SUMMARY OF THE INVENTION

The present invention provides a technique to acquire feature reproduction in an image to be formed.

According to the first aspect of the present invention, there is provided an image processing apparatus comprising: an acquisition unit configured to acquire first image data expressing a color of an image to be formed and second image data expressing a feature of the image; a color separation unit configured to color-separate the first image data into first color material amount data and second color material amount data; a first generation unit configured to generate inverted data acquired by inverting the second image data; a first correction unit configured to generate first corrected color material amount data from the first color material amount data and the inverted data and generate second corrected color material amount data from the second color material amount data and the second image data; and a second generation unit configured to generate, based on the first corrected color material amount data, first data indicating on dot printing positions during a printing and scanning operation of an image forming apparatus, generate, based on the second corrected color material amount data, second data indicating on dot printing positions in the printing and scanning operation, and generate, based on the first data and the second data, image forming data to be output to the image forming apparatus.

According to the second aspect of the present invention, there is provided an image forming apparatus comprising: an image processing apparatus that includes an acquisition unit configured to acquire first image data expressing a color of an image to be formed and second image data expressing a feature of the image, a color separation unit configured to color-separate the first image data into first color material amount data and second color material amount data, a first generation unit configured to generate inverted data acquired by inverting the second image data, a first correction unit configured to generate first corrected color material amount data from the first color material amount data and the inverted data and generate second corrected color material amount data from the second color material amount data and the second image data, and a second generation unit configured to generate, based on the first corrected color material amount data, first data indicating on dot printing positions during a printing and scanning operation of an image forming apparatus, generate, based on the second corrected color material amount data, second data indicating on dot printing positions in the printing and scanning operation, and generate, based on the first data and the second data, image forming data to be output to the image forming apparatus, wherein the same area of a printing medium can be printed and scanned a plurality of times by the same printing material by using a plurality of printing elements.

According to the third aspect of the present invention, there is provided an image processing method comprising: acquiring first image data expressing a color of an image to be formed and second image data expressing a feature of the image, color-separating the first image data into first color material amount data and second color material amount data, generating inverted data acquired by inverting the second image data, generating first corrected color material amount data from the first color material amount data and the inverted data and generating second corrected color material amount data from the second color material amount data and the second image data, and generating, based on the first corrected color material amount data, first data indicating on dot printing positions during a printing and scanning operation of an image forming apparatus, generating, based on the second corrected color material amount data, second data indicating on dot printing positions in the printing and scanning operation, and generating, based on the first data and the second data, image forming data to be output to the image forming apparatus.

According to the fourth aspect of the present invention, there is provided a non-transitory computer readable storage medium storing a program that causes a computer to function as: an acquisition unit configured to acquire first image data expressing a color of an image to be formed and second image data expressing a feature of the image; a color separation unit configured to color-separate the first image data into first color material amount data and second color material amount data; a first generation unit configured to generate inverted data acquired by inverting the second image data; a first correction unit configured to generate first corrected color material amount data from the first color material amount data and the inverted data and generate second corrected color material amount data from the second color material amount data and the second image data; and a second generation unit configured to generate, based on the first corrected color material amount data, first data indicating on dot printing positions during a printing and scanning operation of an image forming apparatus, generate, based on the second corrected color material amount data, second data indicating on dot printing positions in the printing and scanning operation, and generate, based on the first data and the second data, image forming data to be output to the image forming apparatus.

Further features of the present invention will become apparent from the following description of exemplary embodiments (with reference to the attached drawings).

BRIEF DESCRIPTION OF THE DRAWINGS

FIGS. 3A and 3B are views for explaining correction processing of color material amount data;

FIGS. 6A to 6J are views for explaining the generation of image forming data from low-gloss correction color material amount data;

FIGS. 7A to 7J are views for explaining the generation of image forming data from high-gloss correction color material amount data;

FIG. 8 is a view showing examples of image forming data generated from low-gloss image forming data and high-gloss image forming data;

FIGS. 9A to 9J are views for explaining an operation of a case in which cell printing order of a dither matrix is not updated;

FIG. 11 is a view showing an example of a gloss reproducible range LUT;

FIG. 16 is a block diagram showing an example of the arrangement of an image processing apparatus according to Modification 2.

DESCRIPTION OF THE EMBODIMENTS

An image processing apparatus and an image processing method according to an embodiment of the present invention will be described in detail below with reference to the accompanying drawings. Note that the embodiment is not intended to limit the present invention to the scope of the appended claims, and not all combinations of arrangements described in the embodiment are indispensable for the units to solve the problems according to the present invention.

An example in which color image data and gloss image data will be used as pieces of input information of an image processing apparatus will be described below. Color image data is 3-channel color image data including 8-bit R, G, and B components. Gloss image data is 1-channel monochrome image data including 8 bits, and the larger its value, the higher the glossiness (degree of glossiness).

Although a known gloss image clarity value will be used as a gloss value, the present invention is not limited to this definition of the gloss value. When the gloss image clarity value is large, the illuminated image is clear. On the contrary, when the gloss image clarity value is small, it indicates that the illuminated image is unclear. Note that sizes and resolutions of the color image data and the gloss image data are the same.

Note that although an example in which the present invention is applied to inkjet-method image formation will be described below, it is also applicable to image formation by other printing methods such as the electrophotographic method or the sublimation type. The present invention is also applicable to a 3D printer or a printing apparatus that reproduces a concave-convex structure by using ultraviolet-curing ink (to be described in detail later).

First Embodiment

Apparatus Arrangement

Figure 1:
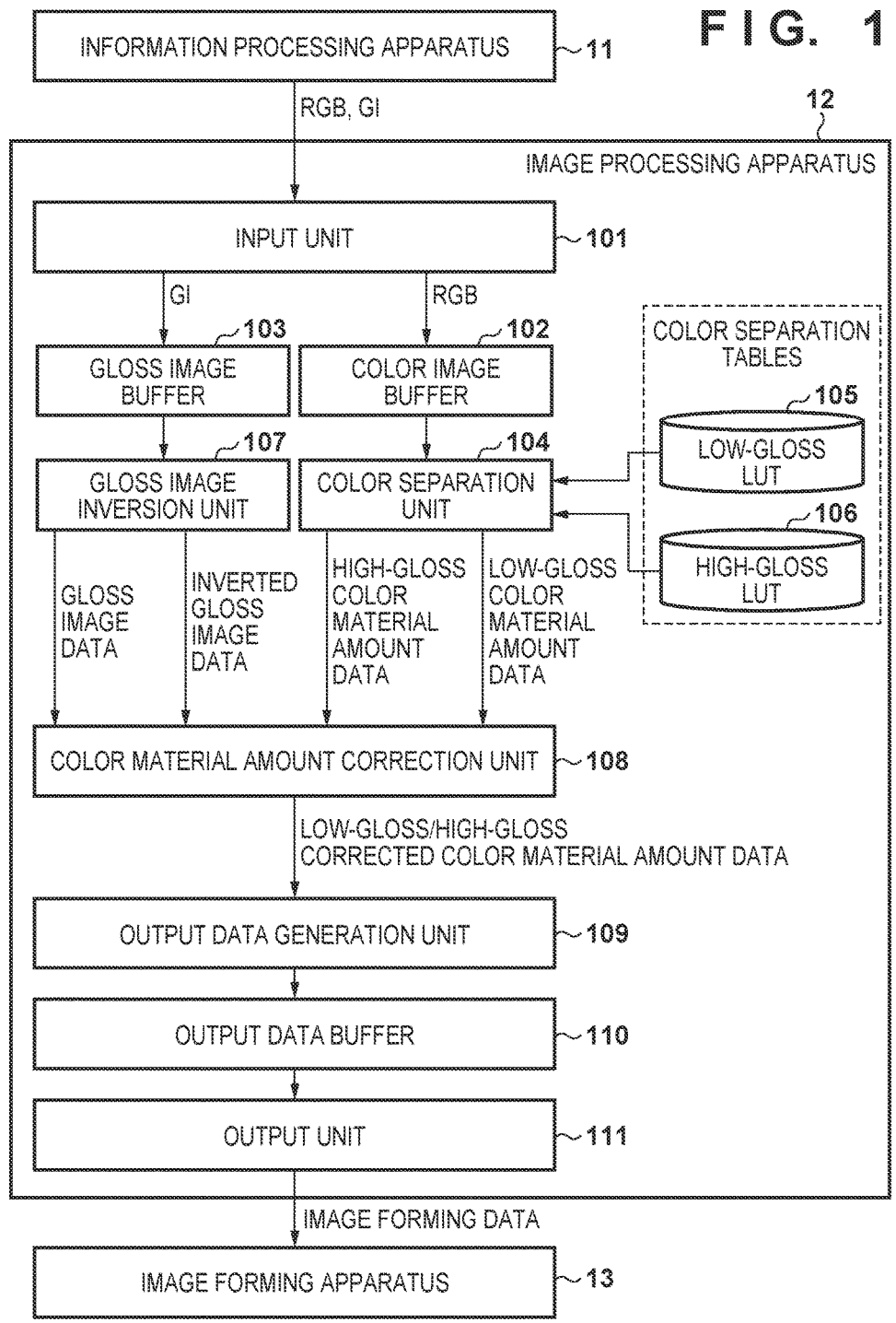
FIG. 1 is a block diagram showing an example of the arrangement of an image processing apparatus according to the first embodiment.

FIG. 1 is a block diagram showing an example of the arrangement of an image processing apparatus according to the first embodiment. An image processing apparatus 12 receives a print job from an information processing apparatus 11 such as a personal computer (PC) and generates, based on color image data and gloss image data included in the print job, image forming data to be output to an image forming apparatus 13 such as an inkjet printer. The image processing apparatus 12 can be implemented by a printer driver installed in the information processing apparatus 11. In such a case, units, processes, and functions of the image processing apparatus 12 (to be described below) are implemented by causing a CPU of the information processing apparatus 11 to execute a predetermined program.

In the image processing apparatus 12, the color image data and the gloss image data as printing targets that are input via an input unit 101 are stored in a color image buffer 102 and a gloss image buffer 103, respectively. As the input unit 101, a serial bus interface such as a USB or a network interface such as a wired or wireless LAN can be used.

A color separation unit 104 executes color separation processing to convert the color image data stored in the color image buffer 102 into data (to be referred to as color material amount data hereinafter) that indicates the use amount of each color material such as ink included in the image forming apparatus 13. At the time of color separation processing, the color separation unit 104 refers to color separation lookup tables (to be referred to as color separation LUTs hereinafter) in which the relationships between the RGB values and the color material data have been described. The image processing apparatus 12 includes, as color separation LUTs, a low-gloss color separation LUT (to be referred to as a low-gloss LUT hereinafter) 105 and a high-gloss color separation LUT (to be referred to as a high-gloss LUT hereinafter) 106. The color separation unit 104 outputs color material amount data that has undergone color separation processing by using these color separation LUTs.

In a case in which the image forming apparatus 13 includes, for example, seven color materials of cyan C, magenta M, yellow Y, black K, light cyan Pc, light magenta Pm, and gray Gy, two types of color material amount data, that is, high-gloss color material amount data and low-gloss color material amount data, are output for each of the seven color materials, and a total of 14 planes of color material data is acquired.

For the same RGB values, the low-gloss LUT 105 and the high-gloss LUT 106 reproduce approximately the same colors and hold color material amount data to reproduce different glosses. The low-gloss LUT 105 holds color material amount data that uses relatively many dark color materials such as C, M, and K, and the high-gloss LUT 106 holds color material amount data that uses relatively many light color materials such as Pc, Pm, and Gy. Color material amount data generated based on the low-gloss LUT 105 and color material amount data generated based on the high-gloss LUT 106 will be called "low-gloss color material amount data" and "high-gloss color material amount data", respectively, hereinafter.

A gloss image inversion unit 107 generates, from the gloss image data stored in the gloss image buffer 103, inverted gloss image data (to be referred to as inverted data hereinafter) which represents an inverted gloss image. The inverted gloss image is an image acquired by inverting the pixel values of the gloss image. Letting the gloss image data be a value between 0 to Gm (for example, 255) and Gl be the pixel value of the gloss image, the pixel value of the inverted gloss image is Gl'=Gm−Gl.

A color material amount correction unit 108 (to be described in detail later) corrects color material amount data output from the color separation unit 104 based on the gloss image data and the inverted data. Post-correction color material amount data will be called "corrected color material amount data" hereinafter.

An output data generation unit 109 (to be described in detail later) generates image forming data based on the corrected color material amount data output from the color material amount correction unit 108. Image forming data is data that defines the printing position of each color material for each printhead scan in the image forming apparatus 13.

An output data buffer 110 stores the image forming data output by the output data generation unit 109. The image forming data stored in the output data buffer 110 is synchronized with the image forming operation of the image forming apparatus 13 and output to the image forming apparatus 13 via an output unit 111. A dedicated interface or a general purpose interface such as a USB, eSATA, PCI, or PCIe® can be used as the output unit 111.

Although the details of the arrangement of the image forming apparatus 13 are omitted, the image forming apparatus 13 can use a plurality of printing elements to print and scan the same area of a printing medium by the same printing material a plurality of times. That is, a printhead is moved lengthwise and breadthwise relatively to the printing medium and prints, on the printing medium, a binary image of each color material expressed by the image forming data. In addition, the image forming apparatus 13 adopts a multi-pass printing method of completing an image by scanning the printhead on the printing medium a plurality of times and a so-called bidirectional printing method of performing printing operations in both forward scanning and backward scanning of the printhead.

[Image Processing]

Figure 2:
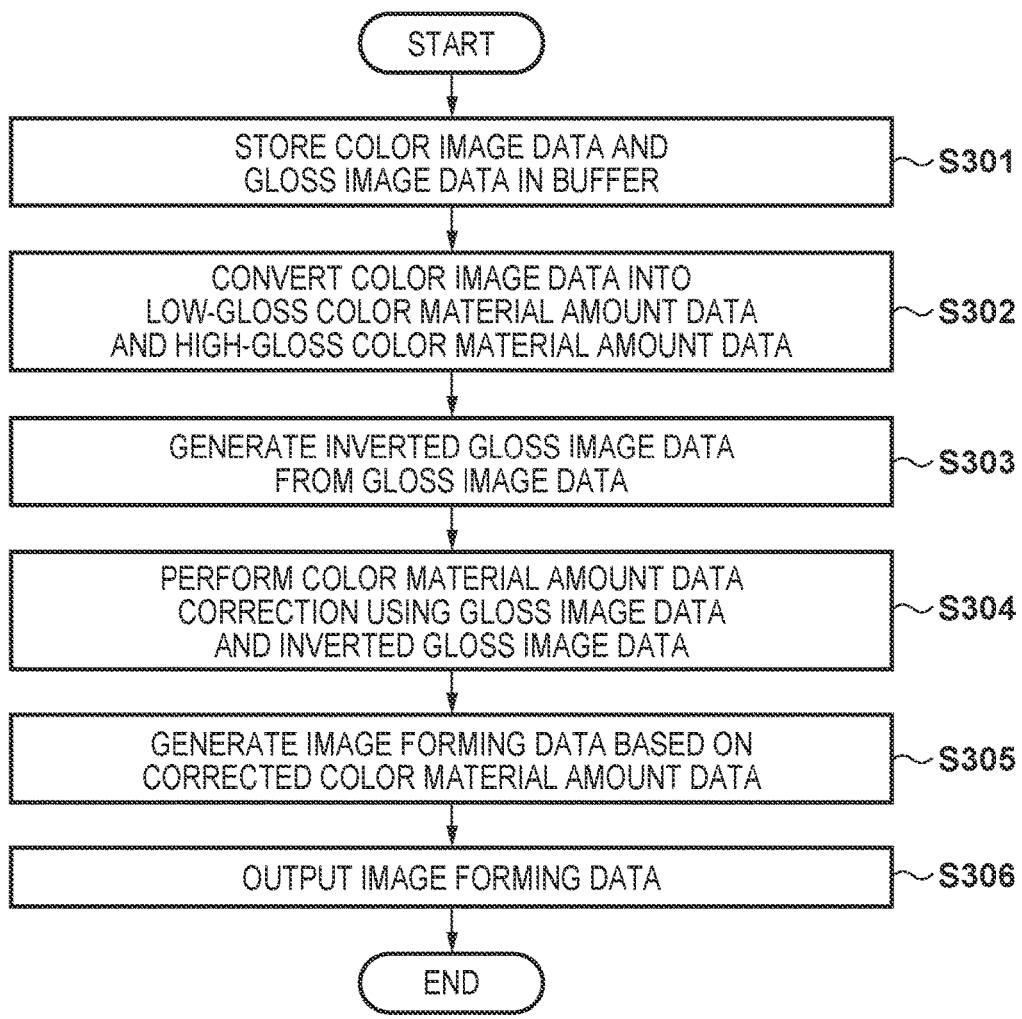
FIG. 2 is a flowchart for explaining image processing of the image processing apparatus.

Image processing of the image processing apparatus 12 will be described with reference to the flowchart of FIG. 2. The input unit 101 stores input color image data in the color image buffer 102 and stores input gloss image data to the gloss image buffer 103 (S301).

The color separation unit 104 refers to the low-gloss LUT 105 and the high-gloss LUT 106 to convert (color-separate) the RGB values of the color image data stored in the color image buffer 102 into two types of CMYKPcPmGy values and generate low-gloss color material amount data and high-gloss color material amount data (S302). Note that although each color material has 8 bits in the color material data after color separation, the bit depth (number of tones) is arbitrary.

The gloss image inversion unit 107 generates inverted data from the gloss image data stored in the gloss image buffer 103 (S303). The color material amount correction unit 108 performs color material amount data correction (S304). Color material amount data correction processing will be described with reference to FIGS. 3A and 3B. Note that for the sake of descriptive convenience, the image size is set to 4×4 pixels, and each of the color material amount data and the gloss image data is set to 4 bits (16 tones) in FIGS. 3A and 3B.

FIG. 3A shows the correction processing of low-gloss color material amount data. A low-gloss corrected color material amount data 403 is data acquired by normalizing the multiplication result of low-gloss color material amount data 401 and inverted gloss image data 402 for each pixel based on the number of tones. Normalization based on the number of tones is performed by dividing the multiplication result by N (=number of tones−1) and dropping or rounding off the fraction part. FIG. 3B shows the correction processing of high-gloss color material amount data. High-gloss corrected color material amount data 406 is data acquired by normalizing the multiplication result of high-gloss color material amount data 404 and gloss image data 405 for each pixel based on the number of tones.

Next, the output data generation unit 109 (to be described in detail later) generates image forming data based on the corrected color material amount data and stores the image forming data in the output data buffer 110 (S305). The image forming data is output as a whole image or as data of an arbitrary size unit such as the bandwidth corresponding to a unit printing area to the image forming apparatus 13 by the output unit 111 (S306), and formation of the image expressed by the image forming data is started. Note that the processes of steps S302 to S305 may be performed once for the whole image or may be performed for a size unit such as the bandwidth.

Output Data Generation Unit

Figure 4:
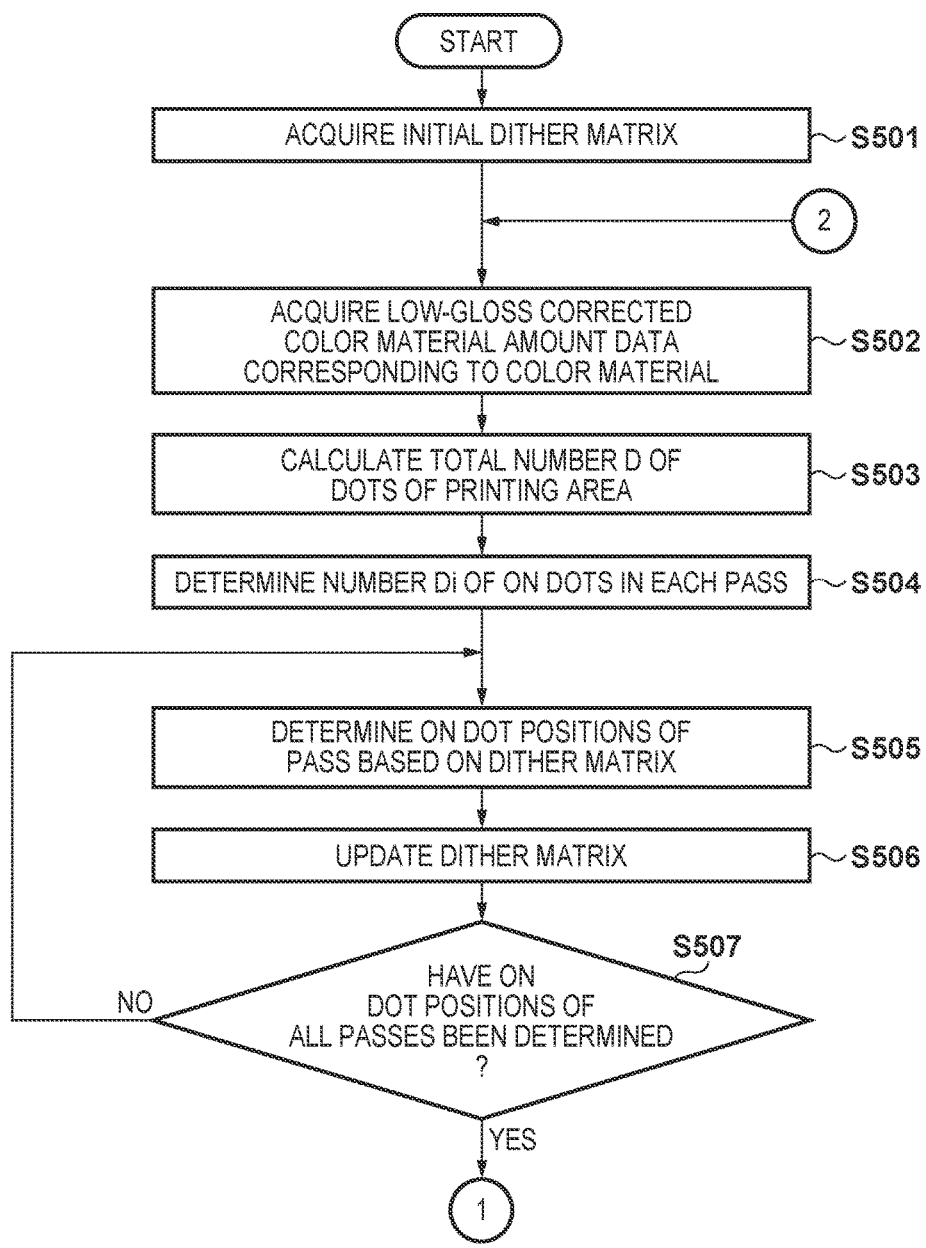
FIG. 4 is a flowchart for explaining generation processing of image forming data by an output data generation unit.
Figure 5:
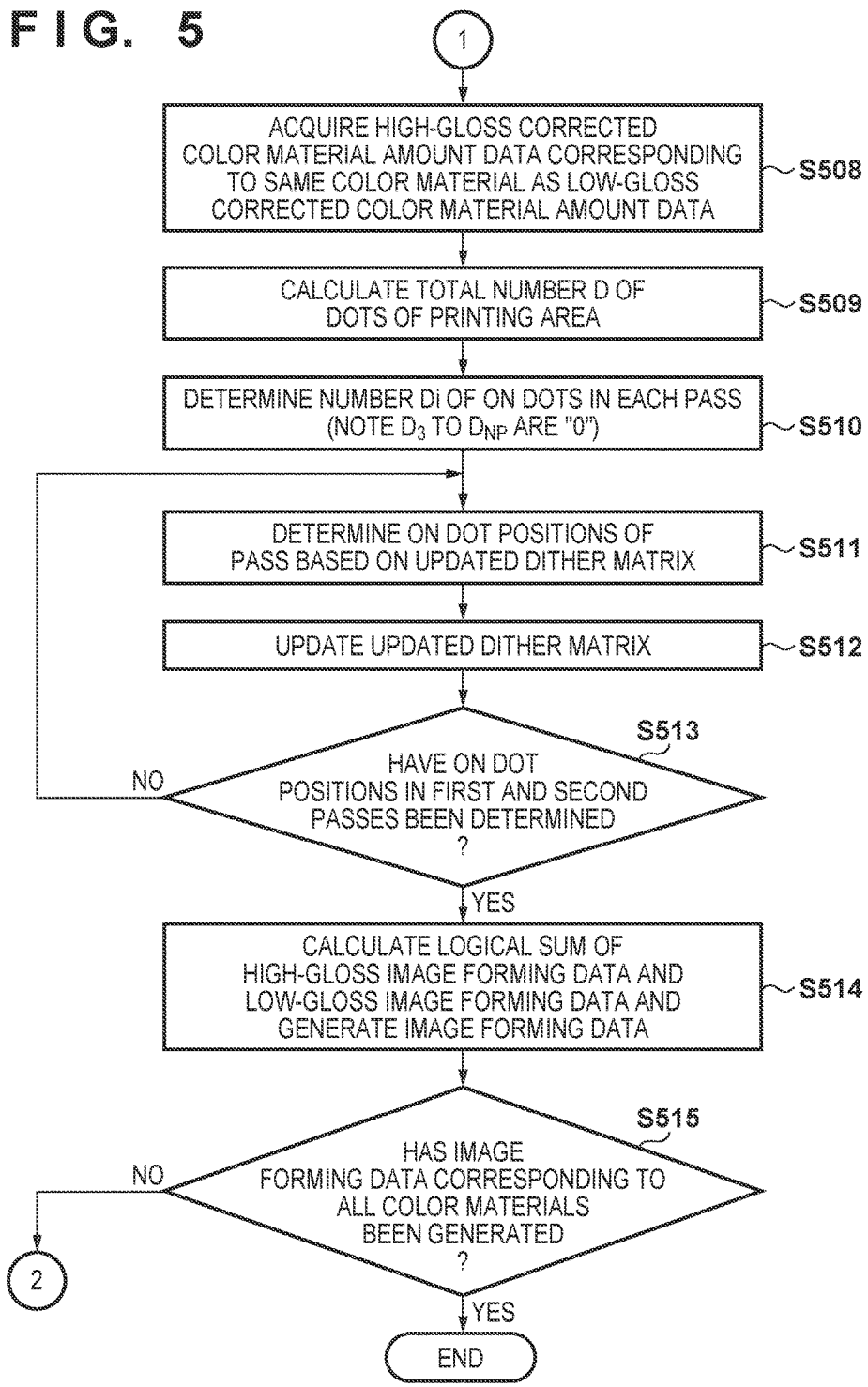
FIG. 5 is a flowchart for explaining the generation processing of image forming data by the output data generation unit.

Generation processing of image forming data by the output data generation unit 109 (S305) will be described with reference to the flowcharts of FIGS. 4 and 5. For the sake of descriptive convenience, an example in which a 4×4 dot printing area is set as a target and an image is formed by corrected color material amount data of 4 bits (16 tones) and an 8-pass printing and scanning operation will be described. In addition, the generation of image forming data is performed for each color material.

The output data generation unit 109 acquires an initial dither matrix (S501). Note that the initial dither matrix is stored in the ROM or the like of the output data generation unit 109. Next, the output data generation unit 109 acquires the low-gloss corrected color material amount data 403 which corresponds to a given color material from the color material amount correction unit 108 (S502).

The generation of image forming data from the low-gloss corrected color material amount data will be described with reference to FIGS. 6A to 6J. FIG. 6A shows the low-gloss corrected color material amount data 403 in which each pixel value is "10", FIG. 6B shows the dither matrix, and FIGS. 6C to 6J each show on dots corresponding to the low-gloss corrected color material amount data 403. A printing order of 0 to 15 of on dots is stored in the 4×4 cells of the dither matrix.

Next, the output data generation unit 109 calculates a total number D of dots of the printing area by the following equation (S503):

$$D=\Sigma_x\Sigma_y I(x,y)/Nc; \quad (1)$$

where I(x, y) represents a pixel value at a pixel position (x, y) of the low-gloss corrected color material amount data 403 and Nc represents the number of cells (Nc=16 in the examples of respective FIGS. 6A to 6J).

That is, the total number D of dots is a value acquired by dividing the sum of the pixel values of the low-gloss corrected color material amount data 403 in the printing area by the number Nc of cells, and D=10 in each of the examples of FIGS. 6A to 6J. Then, the output data generation unit 109 determines a number Di of on dots in each pass (S504) by the following procedure. First, a number Dp of on dots is calculated by:

$$Dp=D\times Rp=D\times 1/Np; \quad (2)$$

where Rp represents a ratio of the number of dots for each printing and scanning operation and Np represents a number of passes of the printing and scanning operation.

According to equation (2), the total number D of dots is equally divided, and the number of on dots for each pass is Dp=1.25 for each of the examples of FIGS. 6A to 6J. In order to assign the fraction part of the number Dp of on dots to a pass, the output data generation unit 109 determines the number Di of on dots for each pass by the following procedure:

```
Int = INT(Dp);
dec = Dp − Int;
for (i = 1, i ≤ Np, i++) {
  Di = Int;
}
if (dec > 0) {
  i = 1;
  Int = dec × Np;
  while (Int > 0) {
    Di = Di + 1;
    Int = Int − 1;
    i ++;
    if (i > Np)
      i = 1;
  }
}
                                        ... (3)
``` where INT(x) represents a function that drops the fraction part of a real number x.

In the examples of FIGS. 6A to 6J, $D_1$ and $D_2$ become "2", and $D_3$ to $D_8$ become "1". Note that in procedure (3), although an example in which the number of on dots corresponding to the fraction part is assigned in order from a lower pass (in order from the first pass, the second pass, . . . ) is shown, the number of on dots can be assigned in order from an upper pass (in order from the Npth pass, the Np−1th pass, . . . ) Alternatively, the number of on dots can be assigned in a random pass order.

Next, the output data generation unit 109 refers to the dither matrix to determine the Di on dot positions in each pass. FIG. 6C shows the on dot positions of the first pass determined for the low-gloss corrected color material amount data 403. In the same manner, FIGS. 6D to 6J show the on dot positions of the respective second pass to the 8th pass determined for the low-gloss corrected color material amount data 403.

Determination of on dot positions for each pass is performed in accordance with the printing order set for the cells of the dither matrix. In FIG. 6C, the output data generation unit 109 determines the positions corresponding to the dither matrix printing order of "0" and "1" cells as the on dot positions of the first pass (S505) and adds the number Nc of cells (16 in this example) to the printing order of each of these two cells (S506). Hence, the printing order of the cells is updated, as shown in FIG. 6D, from "0" and "1" to "16" and "17", respectively.

The output data generation unit 109 determines whether the on dot positions for all passes have been determined (S507). If there is an undetermined pass, the process returns to step S505 to determine the on dot positions of the next pass. Note that, although it is not shown in FIGS. 4 and 5, the processes of steps S505 and S506 can be skipped if Di=0. In accordance with the above-described processes, the on dot positions of the first pass to the Npth pass for the low-gloss corrected color material amount data 403 are determined, and the low-gloss image forming data is generated.

Next, the output data generation unit 109 acquires the high-gloss corrected color material amount data 406 corresponding to the same color materials as the low-gloss corrected color material amount data 403 from the color material amount correction unit 108 (S508). Generation of image forming data from the high-gloss corrected color material amount data will be described with reference to FIGS. 7A to 7J. FIG. 7A shows the high-gloss corrected color material amount data 406 in which each pixel value is "5", FIG. 7B shows an updated dither matrix which has been updated during the generation of low-gloss corrected image forming data, and FIGS. 7C to 7J each show on dots corresponding to the high-gloss corrected color material amount data 406. In this example, on dot printing order of 10 to 25 is stored in the 4×4 cells of the updated dither matrix.

The output data generation unit 109 calculates, according to equation (1), the total number D of dots of the printing area (S509). D=5 in each of the examples of FIGS. 7A to 7J. Next, the output data generation unit 109 determines, in accordance with the following procedure, the number Di of on dots for each pass (S510). First, the number Dp of on dots for each pass is calculated by the following equation:

$$Dp=D\times Rp=D\times\tfrac{1}{2}; \quad (4)$$

In equation (4) in which the number Dp of dots for each pass is calculated, the ratio Rp of the number of dots for each printing and scanning operation differs from that in the case of the low-gloss corrected color material amount data. According to equation (4), the total number D of dots is divided in to two, and Dp=2.5 in each of the examples of FIGS. 7A to 7J. In order to assign the fraction part present in the number Dp of on dots to each pass, the output data generation unit 109 determines the number Di of on dots for each pass in accordance with the following procedure:

```
Int = INT (Dp) ;
dec = Dp - Int;
for (i = 1, i ≤ NP, i++) {
  if (i ≤ 2)
    Di = Int;
  else
    Di = 0;
}
if (dec > 0)
  D₁ = D₁ + 1;
```
. . . (5)

That is, on dots are assigned to the first pass and the second pass, and $D_1=3$, $D_2=2$, and $D_3$ to $D_{Np}$ become "0" in the examples of FIGS. 7A to 7J, respectively. In other words, on dots are not assigned to the third to 8th passes.

Next, the output data generation unit 109 determines, by the same processes as those in steps S505 and S506, the on dot positions for each pass. In FIG. 7C, the output data generation unit 109 determines three dots respectively corresponding to the cells of the printing order of "10", "11", and "12" of the updated dither matrix are determined as the on dots of the first pass (S511). Then, the number Nc of cells (16 in this example) is added to the printing order of each of these three cells (S512). Hence, the printing order of the cells is updated from "10", "11", and "12" to "26", "27", and "28" as shown in FIG. 7D.

The output data generation unit 109 determines whether the on dot positions for the first and second passes have been determined (S513). If there is an undetermined pass, the process returns to step S511, and the on dot positions of the next pass are determined. Note that, although it is not shown in FIGS. 4 and 5, the processes of steps S511 and S512 can be skipped if Di=0. In accordance with the above-described processes, the on dot positions of the first pass to the Npth pass for the high-gloss corrected color material amount data 406 can be determined, and the high-gloss image forming data is generated.

Next, the output data generation unit 109 generates image forming data by calculating the logical sum of the low-gloss image forming data and the high-gloss image forming data and stores the calculated image forming data in the output data buffer 110 (S514). FIG. 8 shows an example of the image forming data generated from the low-gloss image forming data and the high-gloss image forming data. Note that FIG. 8 shows 8 passes of image forming data each expressing one color material and having a 4×4 dot area.

The output data generation unit 109 determines whether image forming data corresponding to every one of the color materials has been generated (S515). If there is a color material whose image forming data has not been generated, the process returns to step S502, and the image forming data corresponding to the next color material is generated.

According to the above-described processes, if the value of the input gloss image data is in-between the maximum value and the minimum value, high-gloss image forming data and low-gloss image forming data will coexist in accordance with the ratio corresponding to the gloss value. Dots printed in a small number of passes based on the high-gloss LUT 106 having a color separation characteristic in which relatively many light color materials are used and dots printed in a large number of passes based on the low-gloss LUT 105 having a color separation characteristic in which relatively many dark color materials are used coexist at a ratio corresponding to the gloss value.

Furthermore, the output data generation unit 109 generates low-gloss image forming data so that the on dots are distributed in the respective passes and generates the high-gloss image forming data so the on dots are concentrated in some of the passes. That is, since gloss reproduction control is performed not only by using the low-gloss LUT and the high-gloss LUT but also by including the number of on dots, the dot arrangement, and the number of passes, the gloss range (dynamic range) can become wider, and gloss reproduction of multiple tones becomes possible. As a result, as a feature reproduction of an image to be formed, smooth gloss reproduction can be acquired in a wide dynamic range.

In the above-description, although an example in which gloss image data is input from the outside has been described, the present invention is not limited to the above-described method of acquiring glossing image data. For example, an arbitrary method such as generating gloss image data from a luminance distribution or a histogram of color image data can be used.

Also, although an example including two types of color separation LUTs has been explained, it is possible to include only one color separation LUT. In this case, although there will only be one type of color material data, since low-gloss corrected color material amount data and high-gloss corrected color material data are generated by the color material amount correction unit 108 and the processing of output data generation unit 109 is executed, enlargement of gloss range and gloss reproduction of multiple tones become possible. On the other hand, if more than three types of color separation LUTs are included, at least three types of data (for example, low-gloss corrected color material data, high-gloss corrected color material data, and medium-gloss corrected color material data) are generated, and the number of passes to which on dots are assigned (to be referred to as the number of assigned passes hereinafter) for each type of data will be controlled.

The generation method of the image forming data is not limited to the above description. To acquire an effect of the present invention, either the determination method of the dot arrangement or the determination method of the number of assigned passes need to differ for the generation of high-gloss image forming data and low-gloss image forming data. For example, the dot concentration degree may differ but the number of assigned passes may be the same, or the number of assigned passes may differ but the dot arrangement may be the same.

Although an example in which two types, that is, high-gloss image forming data and low-gloss image forming data, coexist has been described, the number of types of data that can coexist is not limited and may be three types or more. The order of generating the high-gloss image forming data and the low-gloss image forming data is arbitrary, and either data can be generated first or both types of data may be generated simultaneously. The method of determining dot positions is not limited, and the type, the size, and initialization timing of the dither matrix to be used are arbitrary.

Although an example in which the printing order of the cells of a dither matrix is updated has been described in step S506, whether to update the printing order can be arbitrary selected. As an example, it is possible to reproduce a gloss of a lower value if no updating is performed when low-gloss image forming data is generated. This is because, as shown in FIGS. 9A to 9J, the on dots are set on same positions, and the concave-convex structure on the printing medium is emphasized due to the overlapping on dots.

Although an example in which the printing order of the cells of the dither matrix has different values has been described, but a dither matrix having the same printing order may be used. In this case, to update the printing order, a value which is equal to or larger than the maximum value of the initial dither matrix cells can be added to the cell value in place of the number Nc of cells.

Although an example in which the arrangement of on dots is determined for each pass has been described, it may also be an arrangement in which the arrangement of on dots is determined first and then assigned to each pass. In addition, although an example in which the number Di of on dots of each pass is determined after the total number D of dots in a predetermined area has been described, the number Di of on dots may be determined from the corrected color material amount data for each pass without determining the total number D of dots.

Although an example using 8 passes has been described, but the number of passes is arbitrary. If the number of passes is 1, control related to the number of passes cannot be performed, but control of on dot positions is possible. Additionally, although an example that employs bidirectional printing has been described, unidirectional printing can be employed. A printing method using a plurality of printheads may also be applied to the present invention.

Furthermore, in the image forming apparatus 13, the arrangement of the printhead is arbitrary, and arbitrary arrangements can be adopted for the number of nozzles, the number of printing materials, and types of printing materials. For example, a full multihead longer than the width of the printing medium may be used. Arbitrary printing materials such as spot color materials such as red and green, white color materials, clear color materials which are almost colorless and transparent, metallic materials, pearl materials, and the like can be used. Pigment ink, dye ink, solvent ink, fluorescent ink, ultra-violet curing ink, and the like can also be selected arbitrarily.

Second Embodiment

An image processing apparatus and an image processing method according to the second embodiment of the present invention will be described below. Note that in the second embodiment, the same reference numerals as those in the first embodiment denote the same components and a detailed description thereof may be omitted.

In the first embodiment, a method in which high-gloss image forming data and low-gloss image forming data are caused to coexist by directly using input gloss image data has been described. However, since the color characteristic changes for each color in a printer which generally uses pigment ink, according to the method of the first embodiment, in a case in which the gloss image data is the same but the color image data is different, the reproduced glosses may become different. In the second embodiment, an example in which a gloss reproducible range for each color is acquired and gloss image data is corrected and used based on the gloss reproducible range will be described.

Figure 10:
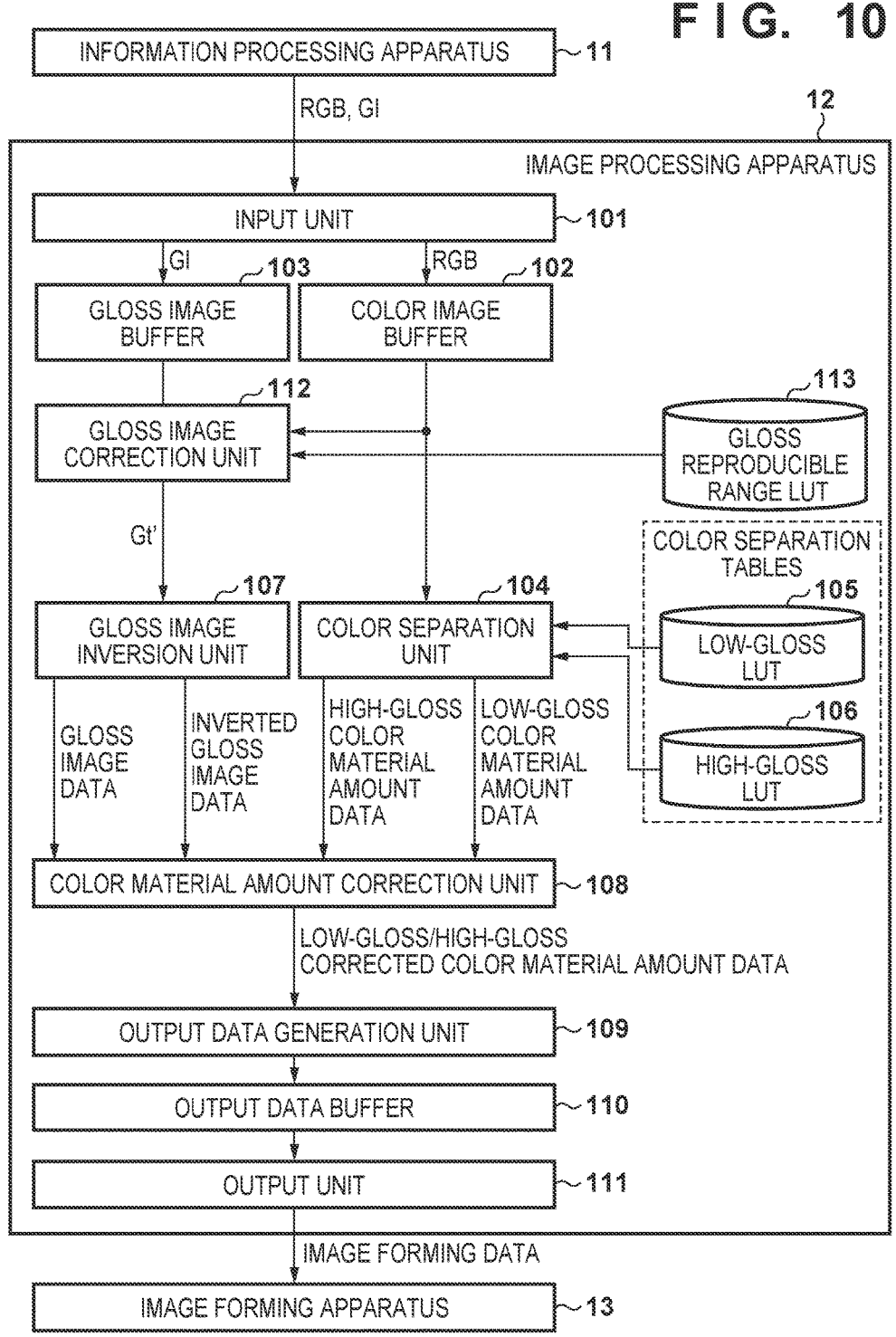
FIG. 10 is a block diagram showing an example of the arrangement of an image processing apparatus according to the second embodiment.

FIG. 10 is a block diagram showing an example of the arrangement of an image processing apparatus according to the second embodiment. An image processing apparatus 12 according to the second embodiment includes, in addition to the components of the first embodiment, a gloss image correction unit 112 and a gloss reproducible range lookup table (gloss reproducible range LUT) 113. The gloss image correction unit 112 refers to the gloss reproducible range LUT 113 and corrects the gloss image data stored in a gloss image buffer 103.

FIG. 11 shows an example of the gloss reproducible range LUT 113. The gloss reproducible range LUT 113 is a table that shows a low-gloss value $G_L$ and a high-gloss value $G_H$ for each combination of the RGB values. The low-gloss value $G_L$ is a gloss value that is reproducible when the minimum gloss image data Gl=0 and is a gloss value acquired, for example, when a low-gloss LUT 105 is used to perform an image forming operation by using a large number of passes. Additionally, the high-gloss value $G_H$ is a value that is reproducible when the maximum gloss image data Gl=255 and is a gloss value reproduced, for example, when a high-gloss LUT 106 is used to perform an image forming operation by using a small number of passes. The low-gloss value $G_L$ and the high-gloss value $G_H$ generally change for each color (for each combination of RGB values).

Note that the gloss reproducible range LUT 113 need not hold the low-gloss values $G_L$ and the high-gloss values $G_H$ for all of the combinations of RGB values and holds, for example, the low-gloss values $G_L$ and the high-gloss values $G_H$ that correspond to $17^3=4913$ matrix points acquired by dividing RGB values into 16 increments. An arbitrary interpolation method such as tetrahedron interpolation or the like can be used to acquire the low-gloss values $G_L$ and the high-gloss values $G_H$ which correspond to the RGB values between the matrix points.

The gloss image correction unit 112 acquires a minimum value $G_L$min of the low-gloss value $G_L$ and a maximum value $G_H$max of the high-gloss value $G_H$ stored in the gloss reproducible range LUT 113. Next, the gloss image correction unit 112 converts a value Gl of gloss image data of a pixel of interest by:

$$Gt=(Gl/Glmax)(G_H max-G_L min)+G_L min; \quad (6)$$

where Glmax represents a maximum value of the gloss image data stored in the gloss image buffer 103.

According to equation (6), the gloss image data of the range of Gl=0 to Gl=Glmax is normalized to the range of Gt=$G_L$min to Gt=$G_H$max. Then, the gloss image correction unit 112 converts a normalized gloss value Gt into:

$$Gt'=\{Gt-G_L(RGB)\}/\{G_H(RGB)-G_L(RGB)\};$$

if $(Gt'<0)$ $Gt'=0;$ if $(Gt'>1)$ $Gt'=1;$ $$Gt'=Gt'\times 255; \quad (7)$$

where $G_L(RGB)$ represents the low-gloss value $G_L$ with respect to the RGV values of the pixel of interest and $G_H(RGB)$ represents the high-gloss value $G_H$ with respect to the RGV values of the pixel of interest.

According to equation (7), a normalized gloss value Gt' is returned to, for example, an 8-bit value after being converted to a ratio (0-1) indicating a position in the range of $G_L(RGB)$ to $G_H(RGB)$. The gloss image correction unit 112 supplies to the gloss image inversion unit 107 the gloss value Gt' which is acquired in this manner.

In this manner, even in a case in which the color image data differs for the same value of gloss image data, smooth gloss reproduction can be acquired while reproducing approximately the same gloss.

Note that the normalization method of gloss image data is not limited to this, and the minimum low-gloss value $G_L$min and the maximum high-gloss value $G_H$max can be set arbitrarily. In addition, in order to bring the method closer to a sensory amount, a nonlinear equation may be used as the equation used for normalization. Alternatively, a conversion table may be used.

Third Embodiment

An image processing apparatus and an image processing method according to the third embodiment of the present invention will be described. Note that in the third embodiment, the same reference numerals as those in the first embodiment and the second embodiment denote the same components and a detailed description thereof may be omitted.

In the first and second embodiments, examples in which the low-gloss LUT 105 and the high-gloss LUT 106 hold respective color material amount values to reproduce approximately the same color with respect to the same RGB values have been described. However, depending on the processing of the image forming apparatus 13, a color reproducible range may greatly change depending on whether gloss value becomes maximum or minimum. For example, the color reproducible range is wide since many dark color materials are used in the case of low gloss, and the color reproducible range may become narrow since many light color materials are used in the case of high gloss.

In other words, if a color separation LUT is designed so that approximately the same color will be reproduced for low-gloss and high-gloss with respect to the same RGB values, it becomes a color design that corresponds to the color reproducibility of high gloss having a narrow color reproducible range. As a result, it becomes difficult to make use of the reproducible color reproducible range in low gloss. The third embodiment will describe an example in which the color reproducible range can be used effectively by correcting image data even in when the color reproducible range largely varies depending on the gloss.

Figure 12:
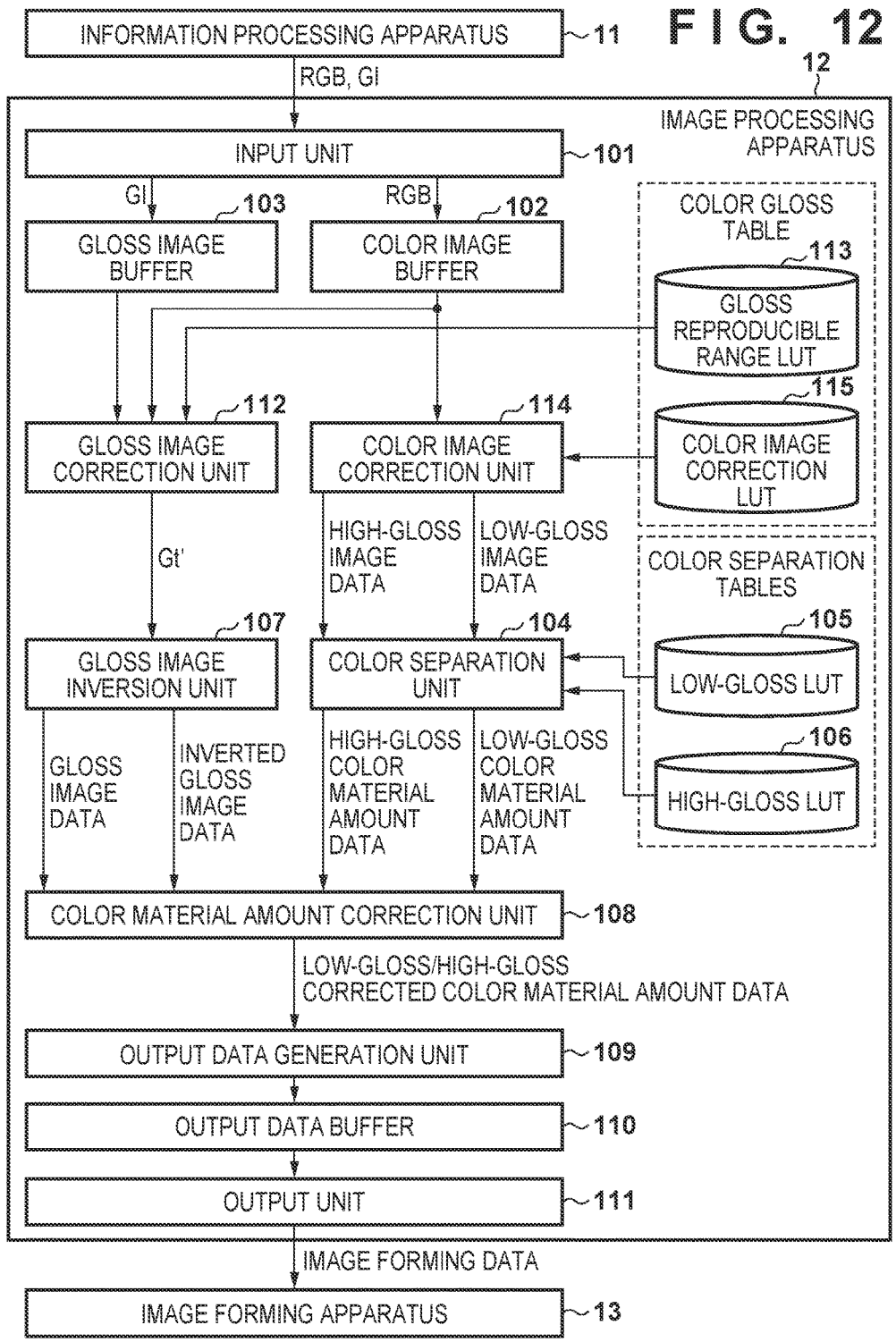
FIG. 12 is a block diagram showing an example of the arrangement of an image processing apparatus according to the third embodiment.

FIG. 12 is a block diagram showing an example of the arrangement of an image processing apparatus according to the third embodiment. An image processing apparatus 12 according to the third embodiment includes, in addition to the components of the second embodiment, a color image correction unit 114 and a color image correction table (color image correction LUT) 115. The color image correction unit 114 refers to the color image correction LUT 115 and generates low-gloss image data and high-gloss image data from the color image data stored in a color image buffer 102.

Low-gloss image data is RGB image data which is converted, in a color separation unit 104, into low-gloss color material amount data with reference to a low-gloss LUT 105. In the same manner, high-gloss image data is RGB image data which is converted, in the color separation unit 104, into high-gloss color material amount data with reference to a high-gloss LUT 106.

Figures 13, 14:
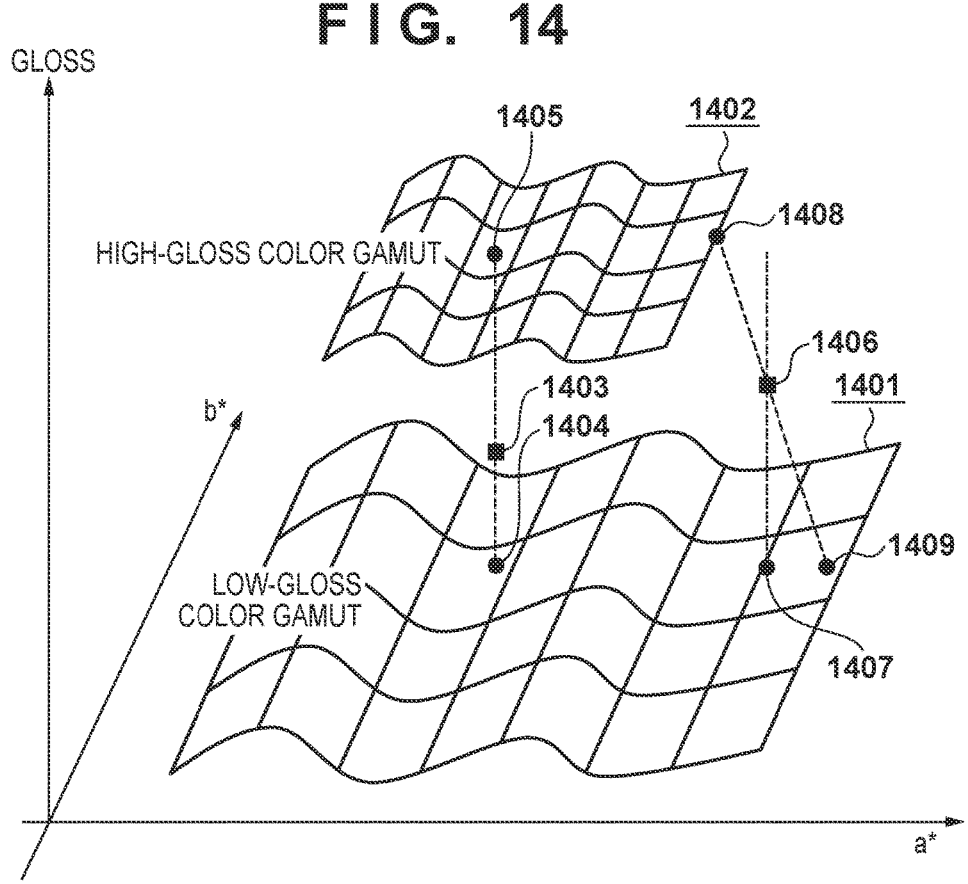
FIG. 13 is a view showing an example of a color image correction LUT.
FIG. 14 is a schematic view for explaining processing of a color image correction unit.

FIG. 13 shows an example of the color image correction LUT 115. The color image correction LUT 115 stores, for each combination of RGB values, corresponding RGB values for low-gloss image data and corresponding RGB values for high-gloss image data. Note that the color image correction LUT 115 need not hold RGB values for all of the combinations of RGB values and holds, for example, the low-gloss image data RGB values and the high-gloss image data RGB values that correspond to the $17^3=4913$ matrix points acquired by dividing the RGB values into 16 increments. To acquire the low-gloss image data RGB values and the high-gloss image data RGB values that correspond to the RGB values between the matrix points, an arbitrary interpolation method such as tetrahedron interpolation can be used.

Processing of the color image correction unit 114 will be described with reference to FIG. 14. FIG. 14 is a schematic view in which a brightness value L* is omitted and a reproducible range of color and gloss is expressed by pieces of color information a* and b* and gloss. The combination of color and gloss will be called "color gloss" hereinafter. In FIG. 14, the brightness value L* is omitted due to a matter of descriptive convenience, and the actual processing is processing that takes place in a color gloss space which is a four-dimensional space using the brightness value L*.

In FIG. 14, a curved plane 1401 expresses the color gloss reproducible range by the low-gloss image forming data, and a curved plane 1402 expresses the color gloss reproducible range by the high-gloss image forming data. The curved plane 1401 and the curved plane 1402 are called "low-gloss color gamut" and "high-gloss color gamut", respectively, hereinafter. As shown in FIG. 14, the low-gloss color gamut and the high-gloss color gamut have different color reproducible ranges and gloss reproducible ranges.

An input value acquired by combining the L*a*b* values and a gloss value G1 is expressed by a single point in the space shown in FIG. 14. If the input value is a point 1403, an intersection point 1404 of the low-gloss color gamut 1401 and a straight line extending in parallel to the gloss axis from the point 1403 and an intersection point 1405 of the high-gloss color gamut 1402 and the straight line are acquired. Then, by mixing the color gloss of the intersection point 1404 and the color gloss of the intersection point 1405 by a predetermined ratio, the color gloss of the point 1403 is reproduced.

The mixture at the predetermined ratio is acquired by designing the color image correction LUT 115 and the gloss reproducible range LUT 113 in the following manner. The RGB values corresponding to the color of the intersection point 1404 are stored as the low-gloss image data RGB values in the color image correction LUT 115, and the gloss value corresponding to the intersection point 1404 is stored in the gloss reproducible range LUT 113 as a low-gloss value $G_L$. On the other hand, the RGB values corresponding to the color of the intersection point 1405 are stored as the high-gloss image data RGB values in the color image correction LUT 115, and the gloss value corresponding to the intersection point 1405 is stored as a high-gloss value $G_H$ in the gloss reproducible range LUT 113.

Additionally, in FIG. 14, in the case of an input value as a point 1406, although there is an intersection point 1407 of the low-gloss color gamut 1401 and a straight line extending in parallel to the gloss axis from the point 1406, there is no intersection point of the high-gloss color gamut 1402 and the straight line extending in parallel to the gloss axis from the point 1406. In other words, there is no point at which the input L*a*b* values can be reproduced on the high-gloss color gamut 1402. In this case, an intersection point 1409 on the low-gloss color gamut 1401 is searched by extending the straight line that connects the point 1406 and an intersection point 1408 closest to the point 1406 on the border of the high-gloss color gamut 1402. Note that if there is a plurality of combinations of the intersection point 1408 and the intersection point 1409, the combination in which the colors of the two intersection points are close to each other is adopted.

Subsequently, the RGB values corresponding to the color of the intersection point 1409 are stored as the low-gloss image data RGB values in the color image correction LUT 115, and a gloss value corresponding to the intersection point 1409 is stored as the low-gloss value $G_L$ in the gloss reproducible range LUT 113. In addition, the RGB values corresponding to the color of the intersection point 1408 are stored as the high-gloss image data RGB values in the color image correction LUT 115, and a gloss value corresponding to the intersection point 1408 is stored in the gloss reproducible range LUT 113 as the high-gloss value $G_H$. In other words, low-gloss image data and high-gloss image data corresponding to the point 1406 are determined by using two points that not only differ in the degrees of glossiness but also differ in L*a*b* values.

The image processing apparatus 12 according to the third embodiment uses a color gloss table that indicates the correspondence between the color gloss indicated by the color image data and the gloss image data, the low-gloss color gamut by the low-gloss image forming data, and the high-gloss color gamut by the high-gloss image forming data. The color gloss table is a combination of the color image correction LUT 115 and the gloss reproducible range LUT 113. Accordingly, even in a case in which the color reproducible range largely changes depending on the gloss, a smooth gloss can be reproduced by effectively using the color reproducible range. Note that, although an example in which L*a*b* values are used for a color has been explained, the color space to express color is arbitrary.

[Modification]

A modification applicable to the present invention will be described below. Note that in the modification, the same reference numerals as those in the first to third embodiments denote the same components and a detailed description thereof may be omitted.

Modification 1

The first to third embodiments showed examples in which color image data and gloss image data are input. However, data that is input is not limited to the gloss image data, and the gloss image data which represents the feature of an image can be created from the color image data. Modification 1 will describe an example in which only the color image data is input and sharpness image data is generated, from the color image data, as image data representing the feature of an image to control the sharpness of an output image by multiple tones.

Figure 15:
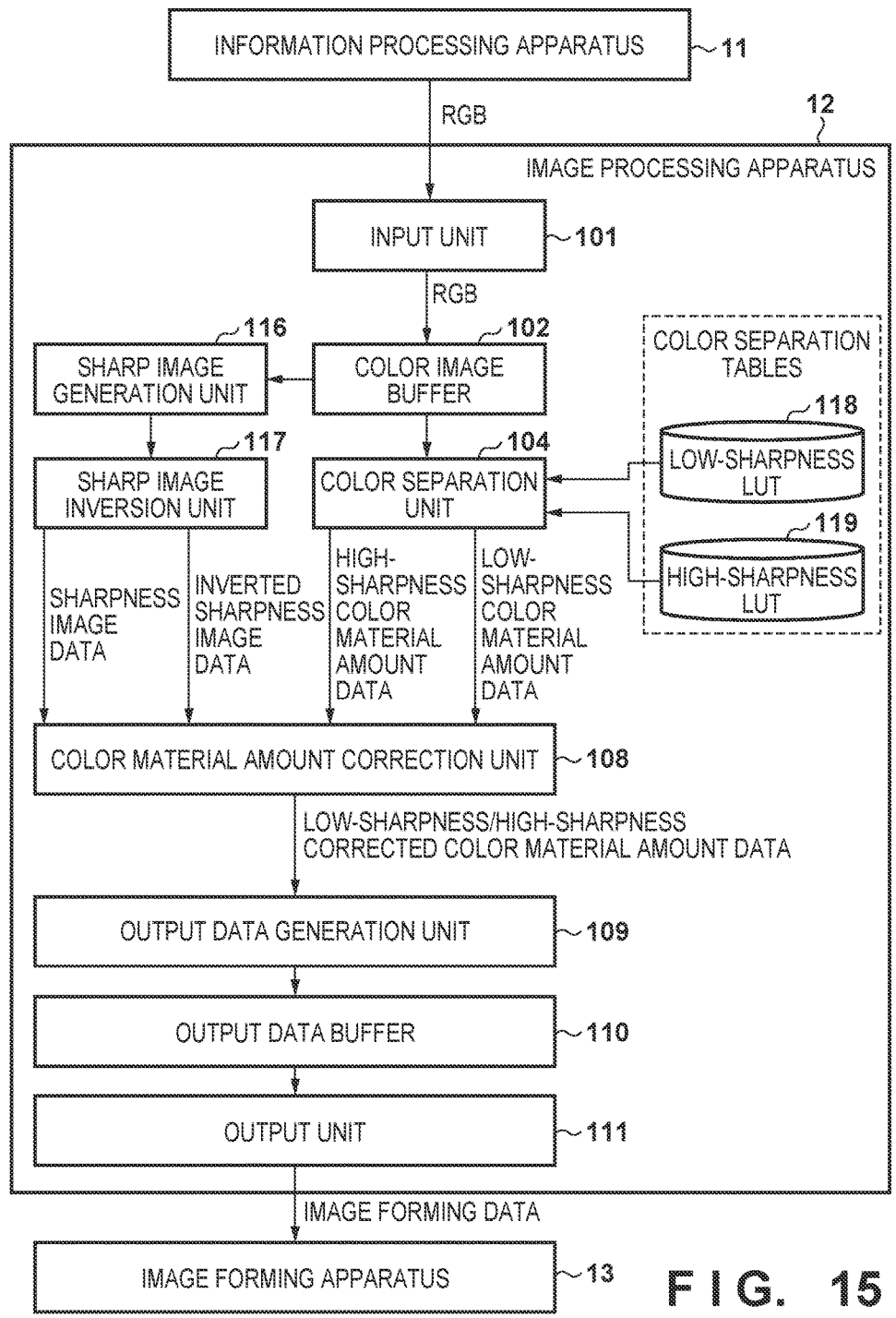
FIG. 15 is a block diagram showing an example of the arrangement of an image processing apparatus according to Modification 1.

FIG. 15 is a block diagram showing an example of the arrangement of the image processing apparatus according to Modification 1. The image processing apparatus 12 of Modification 1 includes a sharp image generation unit 116 and a sharp image inversion unit 117 in place of the gloss image buffer 103 and the gloss image inversion unit 107 of the first embodiment. In addition, a low-sharpness LUT 118 and a high-sharpness LUT 119 for color separation are provided in place of the low-gloss LUT 105 and the high-gloss LUT 106. The input unit 101 inputs only color image data.

The sharp image generation unit 116 generates sharpness image data based on color image data stored in the color image buffer 102. The generation method of sharpness image data uses a method of calculating, in color image data, a pixel value difference between adjacent pixels. The value of the sharpness image data becomes large at a pixel position having a large pixel value difference between adjacent pixels, thereby expressing high sharpness.

The low-sharpness LUT 118 uses relatively many low-sharpness light color materials, and the high-sharpness LUT 119 has a color separation characteristic using relatively many high-sharpness dark color materials. Color material amount data generated based on the low-sharpness LUT 118 is called "low-sharpness color material amount data", and color material amount data generated based on the high-sharpness LUT 119 is called "high-sharpness color material amount data" hereinafter.

The sharp image inversion unit 117 generates inverted sharpness image data (to be referred to as inverted data hereinafter) by inverting the sharpness from the sharpness image data. The color material amount correction unit 108 generates, based on the sharpness image data and the inverted data, corrected color material amount data by correcting the color material amount data output from the color separation unit 104. For each pixel, the color material amount correction unit 108 sets as the low-sharpness corrected color material amount data a value acquired by multiplying the low-sharpness color material amount data and the inverted data, dividing the multiplication result by N (=number of tones−1), and dropping or rounding off the fraction part. Additionally, for each pixel, a value acquired by multiplying the high-sharpness color material amount data and the sharpness image data, dividing the multiplication result by N, and dropping or rounding off the fraction part is set as the high-sharpness corrected color material amount data.

Processing of the output data generation unit 109 will be described below with reference to FIGS. 4 and 5. The output data generation unit 109 acquires an initial dither matrix (S501) and acquires the low-sharpness corrected color material amount data corresponding to a given color material from the color material amount correction unit 108 (S502). The output data generation unit 109 performs processes from calculating the total number D of dots of the printing area (S503) to updating the dither matrix (S506) in the same manner as in the first embodiment. Subsequently, high-sharpness corrected color material amount data corresponding to the same color material as the low-sharpness corrected color material amount data is acquired from the color material amount correction unit 108 (S508).

Next, the output data generation unit 109 calculates the total number D of dots of the printing area (S509) and determines the number Di of on dots for each pass (S510) in accordance with the following procedure:

```
Dp = D/4;
Int1 = INT(Dp);
Int2 = (Dp − Int1) × 4;
for (i = 1, i ≤ Np, i++) {
  if (Mod(i/2) > 0) {
    Di = Int1;
    if (Int2 > 0) {
      Di = Di + 1;
      Int2 = Int2 − 1;
    }
  }
  else
    Di = 0;
}
```
... (8)

That is, on dots are assigned to an odd number printing and scanning operation (odd number pass) and no on dots are assigned to an even number printing and scanning operation (even number pass). The subsequent processes are the same as those in the first embodiment.

According to the such processing, reduction of sharpness due to an registration error in forward scanning and backward scanning during bidirectional printing can be suppressed for high-sharpness image forming data. As a result, as the feature reproduction of an image to be formed, reproduction having a smooth change in sharpness can be acquired based on the sharpness image data generated from the color image data.

Note that although an example using sharpness image data in place of gloss image data has been described above, the type of data is not limited. For example, it may be data representing internal scattering, concave-convex structure, distance, or the like. Additionally, color image data is not essential, and three or more types of data may be input. In other words, the essence of the feature of the present invention is to multi-tonally reproduce, when a reproducing value of a given characteristic value (such as gloss) is defined by two or more different printing methods, the reproducing value of the characteristic value, so that the present invention is applicable to an arbitrary characteristic value.

Modification 2

The first to third embodiments and Modification 1 described examples in which color materials were used for image formation. Modification 2 will described an image formation which reproduces a concave-convex structure. FIG. 16 is a block diagram showing an example of the arrangement of the image processing apparatus according to Modification 2.

The image processing apparatus 12 according to Modification 2 includes a concave-convex data buffer 120 and a concave-convex image generation unit 121 in place of the gloss image buffer 103 and the gloss image inversion unit 107 in the first embodiment. The input unit 101 inputs color image data and concave-convex data. Concave-convex data indicates an image surface height from a printing medium surface at a pixel position, and the larger the concave-convex data, the higher the image surface.

A color separation LUT 122 is provided in place of the low-gloss LUT 105 and the high-gloss LUT 106, and the color separation unit 104 generates only one type of color material amount data. In addition, the image forming apparatus 13 includes, other than a color material, a printing material (concave-convex printing material) for forming a concave-convex structure. The concave-convex printing material is, for example, a substantially colorless and transparent printing material including ultraviolet curing resin. A concave-convex layer is printed on the printing medium by the concave-convex printing material, and an image is formed on (the image surface of) the concave-convex layer by color materials. Note that the concave-convex printing material may be slightly colored or turbid.

The concave-convex image generation unit 121 generates inverted concave-convex image data (to be referred to as inverted data hereinafter) from the concave-convex image data. The color material amount correction unit 108 generates, based on the concave-convex image data and the inverted data, corrected color material amount data acquired by correcting the color material amount data output from the color separation unit 104. For each pixel, the color material amount correction unit 108 sets as the low concave-convex corrected color material amount data a value acquired by multiplying the color material amount data and the inverted data, dividing the multiplication result by N (=number of tones−1), and dropping or rounding off the fraction part. Additionally, for each pixel, a value acquired by multiplying the color material amount data and the concave-convex image data, dividing the multiplication result by N, and dropping or rounding off the fraction part is set as the high concave-convex corrected color material amount data.

Processing of output data generation unit 109 will be described below with reference to FIGS. 4 and 5. The output data generation unit 109 acquires an initial dither matrix (S501) and acquires the concave-convex image data or the low concave-convex corrected color material amount data corresponding to a given color material from the color material amount correction unit 108 (S502). Next, the output data generation unit 109 calculates the total number D of dots of the printing area (S503) and determines the number Di of on dots for each pass (S504) in accordance with the following procedure:

$$
\begin{aligned}
&Dp = D/(Np - 1);\\
&Int1 = INT(Dp);\\
&Int2 = (Dp - Int1) \times (Np - 1);\\
&\text{if (concave-convex image data) \{}\\
&\quad \text{for } (i = 1, i \leq Np, i++) \text{ \{}\\
&\quad\quad \text{if } (i = 1)\\
&\quad\quad\quad Di = D;\\
&\quad\quad \text{else}\\
&\quad\quad\quad Di = 0;\\
&\quad \text{\}}\\
&\text{\} else \{}\\
&\quad \text{for } (i = 1, i \leq Np, i++) \text{ \{}\\
&\quad\quad \text{if } (i = 1)\\
&\quad\quad\quad Di = 0;\\
&\quad\quad \text{else \{}\\
&\quad\quad\quad Di = Int1;\\
&\quad\quad\quad \text{if } (Int2 > 0) \text{ \{}\\
&\quad\quad\quad\quad Di = Di + 1;\\
&\quad\quad\quad\quad Int2 = Int2 - 1;\\
&\quad\quad\quad \text{\}}\\
&\quad\quad \text{\}}\\
&\quad \text{\}}\\
&\text{\}}
\end{aligned}
$$
... (9)

If the number Np of passes=8, all of the on dots are assigned to the first pass for the concave-convex printing material, and no on dots are assigned to subsequent passes. Additionally, on dots are not assigned to the first pass with respect to the color material but are assigned to subsequent passes. In other words, by assigning a large number of passes to the color material, degradation of color reproduction due to nozzle characteristic variation or mechanical change is suppressed.

The output data generation unit 109 determines the on dot positions (S505) and updates the dither matrix (S506) in the same manner as the first embodiment. Then, high concave-convex corrected color material data corresponding to the same color material as the concave-convex image data or the low concave-convex corrected color material amount data is acquired from the color material amount correction unit 108 (S508).

Subsequently, the output data generation unit 109 calculates the total number D of dots of the printing area (S509) and determines the number Di of on dots for each pass in accordance with the following procedure (S510):

$$
\begin{aligned}
&Dp = D/(Np - 1);\\
&Int1 = INT(Dp);\\
&Int2 = (Dp - Int1) \times (Np - 1);\\
&\text{if (concave-convex image data) \{}\\
&\quad \text{for } (i = 1, i \leq Np, i++) \text{ \{}\\
&\quad\quad \text{if } (i = 1)\\
&\quad\quad\quad Di = 0;\\
&\quad\quad \text{else \{}\\
&\quad\quad\quad Di = Int1;\\
&\quad\quad\quad \text{if } (Int2 > 0) \text{ \{}\\
&\quad\quad\quad\quad Di = Di + 1;\\
&\quad\quad\quad\quad Int2 = Int2 - 1;\\
&\quad\quad\quad \text{\}}\\
&\quad\quad \text{\}}\\
&\quad \text{\}}
\end{aligned}
$$

-continued

```
    }
    } else {
        for (i = 1, i ≤ Np, i++) {
            if (i = 1)
                Di = D;
            else
                Di = 0;
        }
    }
                                            ... (10)
```

If the number Np of passes=8, on dots are assigned to the first to the 7th passes, but no on dots are assigned to the 8th pass for the concave-convex printing material. For the color material, on dots are not assigned to the first to 7th passes but are only assigned to the 8th pass. In other words, by assigning a large number of passes to the concave-convex printing material, pre-curing contact of adjacent concave-convex printing material dots is prevented, and degradation of concave-convex reproduction is suppressed. Subsequent processes are the same as those of the first embodiment.

In this manner, in an image forming operation of reproducing a concave-convex structure, smooth concave-convex reproduction can be acquired as the feature reproduction of an image to be formed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-168136, filed Aug. 27, 2015, which is hereby incorporated by reference herein in its entirety.

What is claimed is:

1. An image processing apparatus comprising:
at least one processor; and
a memory having stored thereon instructions which, when executed by the at least one processor, cause the apparatus to:
acquire first image data expressing a color of an image to be formed and second image data expressing a feature of the image;
color-separate the first image data into first color material amount data and second color material amount data;
generate inverted data acquired by inverting the second image data;
generate first corrected color material amount data from the first color material amount data and the inverted data and generate second corrected color material amount data from the second color material amount data and the second image data; and
generate, based on the first corrected color material amount data, first data indicating on dot printing positions during a printing and scanning operation of an image forming apparatus, generate, based on the second corrected color material amount data, second data indicating on dot printing positions in the printing and scanning operation, and generate, based on the first data and the second data, image forming data to be output to the image forming apparatus.

2. The apparatus according to claim 1, wherein the feature of the image is sharpness, the first color material amount data is color material amount data to reproduce low-sharpness, and the second color material amount data is color material amount data to reproduce high-sharpness.

3. The apparatus according to claim 1, wherein the feature of the image is a degree of glossiness, the first color material amount data is low-gloss color material amount data to reproduce low-gloss, and the second color material amount data is high-gloss color material amount data to reproduce high-gloss.

4. The apparatus according to claim 3, wherein the execution of the instructions by the at least one processor further causes the apparatus to generate the low-gloss color material amount data by referring to a color separation characteristic table which uses many dark color materials and generates the high-gloss color material amount data by referring to a color separation characteristic table which uses many light color materials.

5. The apparatus according to claim 3, wherein the execution of the instructions by the at least one processor further causes the apparatus to generate the first corrected color material amount data by normalizing, based on a number of tones, a multiplication result of the low-gloss color material amount data and the inverted data for each pixel and generates the second corrected color material amount data by normalizing, based on the number of tones, a multiplication result of the high-gloss color material amount data and the second image data for each pixel.

6. The apparatus according to claim 3, wherein the execution of the instructions by the at least one processor further causes the apparatus to:
correct, based on a gloss reproducible range corresponding to color image data acquired as the first image data, gloss image data acquired as the second image data.

7. The apparatus according to claim 6, wherein the execution of the instructions by the at least one processor further causes the apparatus to perform the correction by using a gloss reproducible range table which indicates a low-gloss value corresponding to minimum gloss image data and a high-gloss value corresponding to maximum gloss image data that are reproducible for each of the color image data.

8. The apparatus according to claim 7, wherein the execution of the instructions by the at least one processor further causes the apparatus to correct the gloss image data of a pixel of interest based on a minimum value of the low-gloss value, a maximum value of the high-gloss value, a low-gloss value and a high-gloss value corresponding to the color image data of the pixel of interest, and a maximum value of the acquired gloss image data which are obtained from the gloss reproducible range table.

9. The apparatus according to claim 6, wherein the execution of the instructions by the at least one processor further causes the apparatus to:
   correct the color image data and generate low-gloss image data and high-gloss image data, and
   color-separate the low-gloss image data into the low-gloss color material amount data and the high-gloss image data into the high-gloss color material amount data.

10. The apparatus according to claim 9, wherein the execution of the instructions by the at least one processor further causes the apparatus to perform the correction using a color gloss table indicating correspondence between a color gloss indicated by a combination of the color image data and the acquired gloss image data, a low-gloss color gamut indicating a color gloss reproducible range by the first data, and a high-gloss color gamut indicating a color gloss reproducible range by the second data.

11. The apparatus according to claim 10, wherein the color gloss table includes a first table indicating the low-gloss color gamut gloss image data and the high-gloss color gamut gloss image data which correspond to the color gloss indicated by the combination of the color image data and the gloss image data and a second table indicating the low-gloss color gamut color image data and the high-gloss color gamut color image data which correspond to the color gloss, and
   the first table is used for the correction based on a gloss reproducible range corresponding to color image data acquired as the first image data, gloss image data acquired as the second image data, and the second table is used for the correction of the color image data and for generating low-gloss image data and high-gloss image data.

12. The apparatus according to claim 1, wherein the execution of the instructions by the at least one processor further causes the apparatus to determine, in the generation of the first data, the number of on dots in the printing and scanning operation and determines on dot positions based on cell values of a dither matrix.

13. The apparatus according to claim 12, wherein the execution of the instructions by the at least one processor further causes the apparatus to determine, in the generation of the second data, the number of on dots in the printing and scanning operation, determines the on dot positions based on the cell values of the dither matrix, and updates the values of the respective cells of the dither matrix corresponding to the determined on dot positions.

14. The apparatus according to claim 13, wherein the update is performed by adding, to each of the cell values, one of the number of cells of the dither matrix and a value which is not less than a maximum value of cells.

15. The apparatus according to claim 1, wherein the execution of the instructions by the at least one processor further causes the apparatus to determine, in the generation of the first data, the number of on dots in the printing and scanning operation, determines on dot positions based on cell values of a dither matrix, and updates the values of the respective cells of the dither matrix corresponding to the determined on dot positions.

16. The apparatus according to claim 15, wherein the execution of the instructions by the at least one processor further causes the apparatus to determine, in the generation of the second data, the number of on dots in the printing and scanning operation, determines the on dot positions based on the updated cell values of the dither matrix, and updates the values of the respective cells of the dither matrix corresponding to the determined on dot positions.

17. The apparatus according to claim 1, wherein the execution of the instructions by the at least one processor further causes the apparatus to generate the first data so that the on dots are distributed in each of the printing and scanning operations of the image forming apparatus and generates the second data so that the on dots are concentrated in some of the printing and scanning operations.

18. The apparatus according to claim 1, wherein the execution of the instructions by the at least one processor further causes the apparatus to set a logical sum of the first data and the second data as the image forming data, and the on dot printing positions indicated by the first data and the on dot printing positions indicated by the second data coexist in the image forming data.

19. An image forming apparatus comprising:
   an image processing apparatus that includes:
   at least one processor; and
   a memory having stored thereon instructions which, when executed by the at least one processor, cause the apparatus to:
   acquire first image data expressing a color of an image to be formed and second image data expressing a feature of the image,
   color-separate the first image data into first color material amount data and second color material amount data,
   generate inverted data acquired by inverting the second image data,
   to generate first corrected color material amount data from the first color material amount data and the inverted data and generate second corrected color material amount data from the second color material amount data and the second image data, and
   generate, based on the first corrected color material amount data, first data indicating on dot printing positions during a printing and scanning operation of an image forming apparatus, generate, based on the second corrected color material amount data, second data indicating on dot printing positions in the printing and scanning operation, and generate, based on the first data and the second data, image forming data to be output to the image forming apparatus,
   wherein the same area of a printing medium can be printed and scanned a plurality of times by the same printing material by using a plurality of printing elements.

20. An image processing method comprising:
   acquiring first image data expressing a color of an image to be formed and second image data expressing a feature of the image,
   color-separating the first image data into first color material amount data and second color material amount data,
   generating inverted data acquired by inverting the second image data,
   generating first corrected color material amount data from the first color material amount data and the inverted data and generating second corrected color material amount data from the second color material amount data and the second image data, and generating, based on the first corrected color material amount data, first data indicating on dot printing positions during a printing and scanning operation of an image forming apparatus, generating, based on the second corrected color material amount data, second data indicating on dot printing positions in the printing and scanning operation, and generating, based on the first data and the second data, image forming data to be output to the image forming apparatus.

21. A non-transitory computer readable storage medium storing a program that causes a computer to:

acquire first image data expressing a color of an image to be formed and second image data expressing a feature of the image;

color-separate the first image data into first color material amount data and second color material amount data;

generate inverted data acquired by inverting the second image data;

generate first corrected color material amount data from the first color material amount data and the inverted data and generate second corrected color material amount data from the second color material amount data and the second image data; and generate, based on the first corrected color material amount data, first data indicating on dot printing positions during a printing and scanning operation of an image forming apparatus, generate, based on the second corrected color material amount data, second data indicating on dot printing positions in the printing and scanning operation, and generate, based on the first data and the second data, image forming data to be output to the image forming apparatus.

* * * * *